(12) United States Patent
Chlus et al.

(10) Patent No.: US 10,156,150 B2
(45) Date of Patent: Dec. 18, 2018

(54) GAS TURBINE ENGINE STATOR VANE PLATFORM COOLING

(71) Applicant: UNITED TECHNOLOGIES CORPORATION, Hartford, CT (US)

(72) Inventors: Wieslaw A. Chlus, Wethersfield, CT (US); Seth J. Thomen, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 546 days.

(21) Appl. No.: 14/769,208

(22) PCT Filed: Mar. 10, 2014

(86) PCT No.: PCT/US2014/022540
§ 371 (c)(1),
(2) Date: Aug. 20, 2015

(87) PCT Pub. No.: WO2014/159212
PCT Pub. Date: Oct. 2, 2014

(65) Prior Publication Data
US 2016/0003074 A1    Jan. 7, 2016

Related U.S. Application Data

(60) Provisional application No. 61/782,328, filed on Mar. 14, 2013.

(51) Int. Cl.
*F01D 5/22*    (2006.01)
*F01D 9/04*    (2006.01)
*F01D 9/02*    (2006.01)

(52) U.S. Cl.
CPC ............ *F01D 9/042* (2013.01); *F01D 9/023* (2013.01); *F01D 9/041* (2013.01);
(Continued)

(58) Field of Classification Search
CPC ....... F01D 9/042; F01D 9/023; F05D 2240/81
See application file for complete search history.

(56) References Cited

U.S. PATENT DOCUMENTS 4,672,727 A * 6/1987 Field .................. B23P 15/02
29/527.2
4,902,198 A    2/1990 North
(Continued)

FOREIGN PATENT DOCUMENTS

EP    0357984    5/1993
EP    1022437    7/2000
(Continued)

OTHER PUBLICATIONS

International Search Report and Written Opinion for PCT Application No. PCT/US2014/022540, dated Jun. 26, 2014.
(Continued)

*Primary Examiner* — Mark Laurenzi
*Assistant Examiner* — Shafiq Mian
(74) *Attorney, Agent, or Firm* — Carlson, Gaskey & Olds, P.C.

(57) ABSTRACT

An airfoil component for a gas turbine engine includes a platform joined to an airfoil. The platform includes a flow path surface that extends between spaced apart lateral surfaces. The airfoil extends from the flow path surface. A contoured surface adjoins the flow path surface and one of the lateral surfaces.

18 Claims, 3 Drawing Sheets

(52) U.S. Cl.
CPC ......... *F05D 2240/81* (2013.01); *Y02T 50/672* (2013.01); *Y02T 50/676* (2013.01)

(56) References Cited

U.S. PATENT DOCUMENTS

| | | | |
|---|---|---|---|
| 5,088,888 A | 2/1992 | Bobo | |
| 5,726,348 A * | 3/1998 | Draghi | F01D 5/187 73/37 |
| 6,261,053 B1 | 7/2001 | Anderson et al. | |
| 6,506,020 B2 * | 1/2003 | Dailey | F01D 5/18 416/96 R |
| 7,097,423 B2 | 8/2006 | Burdgick | |
| 7,377,742 B2 | 5/2008 | Shapiro et al. | |
| 7,467,922 B2 | 12/2008 | Beeck et al. | |
| 8,201,834 B1 | 6/2012 | Liang | |
| 8,870,535 B2 * | 10/2014 | Lacy | F01D 5/186 416/97 R |
| 2003/0037436 A1 * | 2/2003 | Ducotey, Jr. | B23H 9/10 29/889.1 |
| 2004/0159552 A1 * | 8/2004 | Khan | C23C 30/00 205/112 |
| 2005/0135925 A1 | 6/2005 | Shiozaki et al. | |
| 2010/0264655 A1 | 10/2010 | Rosson et al. | |
| 2010/0322767 A1 * | 12/2010 | Nadvit | F01D 5/186 416/1 |
| 2011/0038710 A1 * | 2/2011 | Kemppainen | F01D 5/288 415/115 |
| 2013/0004315 A1 | 1/2013 | Beeck et al. | |
| 2013/0209236 A1 * | 8/2013 | Xu | F01D 5/186 415/116 |
| 2013/0323080 A1 * | 12/2013 | Martin | F01D 5/186 416/97 R |
| 2014/0219815 A1 * | 8/2014 | Kohli | F01D 5/18 416/97 R |
| 2014/0321961 A1 * | 10/2014 | Beattie | F01D 5/081 415/1 |
| 2015/0192021 A1 * | 7/2015 | Spangler | F01D 5/186 416/96 R |

FOREIGN PATENT DOCUMENTS

| | | |
|---|---|---|
| EP | 2336496 | 6/2011 |
| GB | 1516757 | 7/1978 |

OTHER PUBLICATIONS

Extended European Search Report for European Application No. 14775158.0 dated Sep. 30, 2016.
International Preliminary Report on Patentability for International Application No. PCT/US2014/022540 dated Sep. 24, 2015.

* cited by examiner

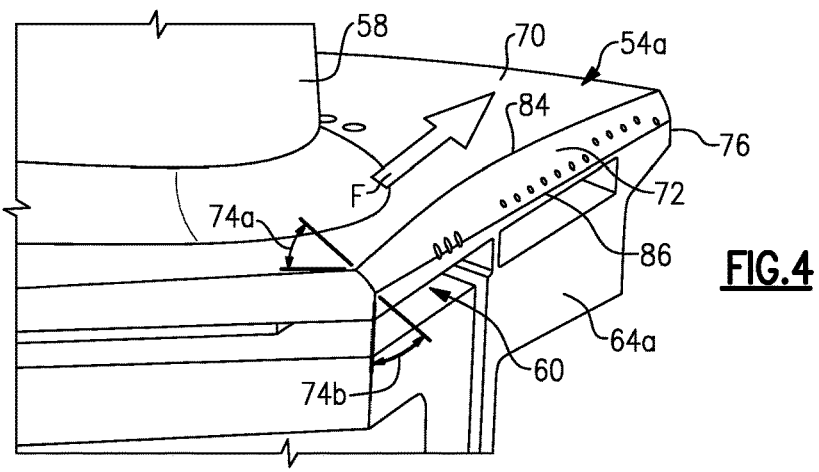
FIG.4
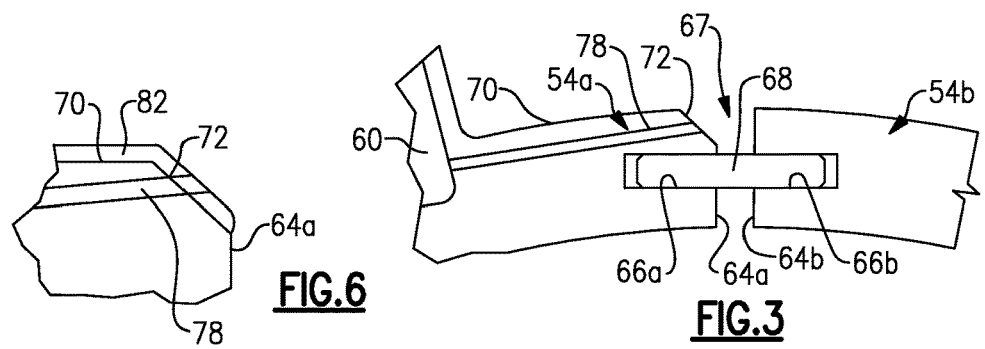
FIG.6
FIG.3
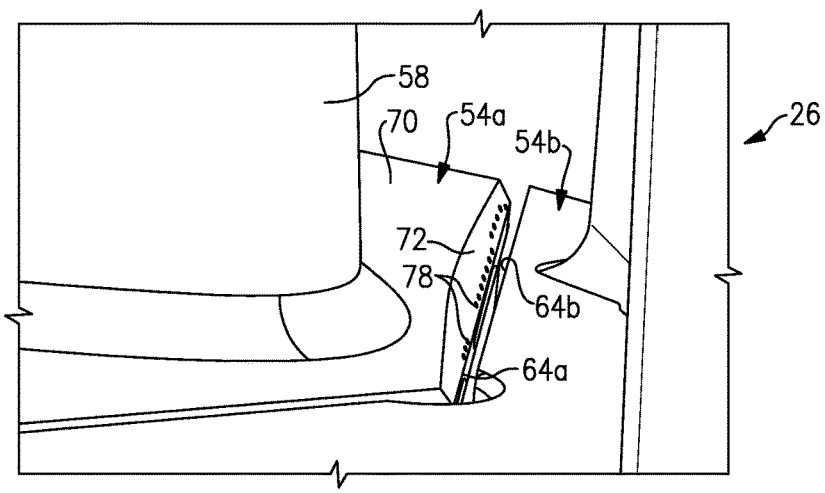
FIG.5A

GAS TURBINE ENGINE STATOR VANE PLATFORM COOLING

BACKGROUND

This disclosure relates to a stator vane platform for a gas turbine engine, such as those used in industrial applications. More particularly, the disclosure relates to a platform cooling configuration for a stator vane.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads. In the case of an industrial gas turbine engine, the turbine section operatively drives a generator, which supplies power to a ground-based power grid.

A typical turbine section includes at least one array of stator vanes. Each stator vane includes spaced apart inner and outer platforms joined to one another by an airfoil. The inner platform includes spaced apart lateral surfaces that circumferentially adjacent lateral surfaces of adjacent stator vanes are in close proximity to one another. A small gap is provided between the adjacent lateral surfaces, and a seal is provided between the adjacent lateral surfaces to seal the inner flow path provided by the inner platform.

The adjacent lateral surfaces are parallel to one another and extend in a radial direction with respect to a rotational axis of the compressor and turbine sections. The lateral surfaces provide a sharp, generally right-angled corner with respect to an inner flow path surface provided by the inner platform. Shower head cooling holes are provided on one of the lateral surfaces to cool the inner platform in the area of the gap.

SUMMARY

In one exemplary embodiment, an airfoil component for a gas turbine engine includes a platform joined to an airfoil. The platform includes a flow path surface that extends between spaced apart lateral surfaces. The airfoil extends from the flow path surface. A contoured surface adjoins the flow path surface and one of the lateral surfaces.

In a further embodiment of the above, inner and outer platforms are joined by the airfoil. One of the inner and outer platforms provides the platform.

In a further embodiment of any of the above, the platform is provided by an inner platform.

In a further embodiment of any of the above, a cooling passage and cooling holes extend through the contoured surface and are in fluid communication with the cooling passage.

In a further embodiment of any of the above, the contoured surface is at first and second angles with respect to the flow path surface and the lateral surface, respectively. The first and second angles are in the range of greater than 0° to 65°.

In a further embodiment of any of the above, the contoured surface is curved.

In a further embodiment of any of the above, the first and second angles are about 45°.

In a further embodiment of any of the above, the exit of the cooling holes are directed aftward toward a trailing edge of the airfoil.

In a further embodiment of any of the above, a thermal barrier coating is provided on the inner flow path surface and the contoured surface. The cooling holes extend through the thermal barrier coating.

In a further embodiment of any of the above, a slot is provided in the platform beneath the flow path surface. The slot is configured to receive a seal.

In a further embodiment of any of the above, a stator vane array for a gas turbine engine includes a circumferential array of stator vanes. Each stator vane has inner and outer platforms joined by an airfoil. The inner platform includes an inner flow path surface extending between spaced apart lateral surfaces. The lateral surfaces of circumferentially adjacent stator vanes are adjacent to one another. The airfoil extends from the inner flow path surface. A contoured surface adjoins the inner flow path surface and one of the lateral surfaces.

In a further embodiment of any of the above, a cooling passage, and cooling holes extend through the contoured surface and are in fluid communication with the cooling passage.

In a further embodiment of any of the above, the contoured surface is at first and second angles with respect to the inner flow path surface and the lateral surface, respectively. The first and second angles are in the range of greater than 0° to 65°.

In a further embodiment of any of the above, the contoured surface is curved.

In a further embodiment of any of the above, the first and second angles are about 45°.

In a further embodiment of any of the above, the cooling holes are directed aftward on a suction side of the airfoil.

In a further embodiment of any of the above, a thermal barrier coating is provided on the inner flow path surface and the contoured surface. The cooling holes extend through the thermal barrier coating.

In a further embodiment of any of the above, a seal is circumferentially extending between adjacent vane inner platforms.

In another exemplary embodiment, a gas turbine engine includes a compressor and turbine sections. A combustor is provided axially between the compressor and turbine sections. A turbine vane is in the turbine section. Inner and outer platforms are joined by an airfoil. The inner platform includes an inner flow path surface extending between spaced apart lateral surfaces. The airfoil extends from the inner flow path surface. A contoured surface adjoins the inner flow path surface and one of the lateral surfaces. A cooling passage and cooling holes extend through the contoured surface and are in fluid communication with the cooling passage. A seal circumferentially extends between adjacent vane inner platforms.

In a further embodiment of any of the above, a generator is operatively coupled to the turbine section. The generator is configured to be electrically connected to a ground-based power grid.

In a further embodiment of any of the above, the contoured surface is at first and second angles with respect to the inner flow path surface and the lateral surface, respectively. The first and second angles are in the range of greater than 0° to 65°.

In a further embodiment of any of the above, the contoured surface is curved.

In a further embodiment of any of the above, a thermal barrier coating is provided on the inner flow path surface and the contoured surface. The cooling holes extend through the thermal barrier coating.

BRIEF DESCRIPTION OF THE DRAWINGS

The disclosure can be further understood by reference to the following detailed description when considered in connection with the accompanying drawings wherein:

FIG. 3 is an enlarged partial cross-sectional view of adjacent inner platforms of circumferentially adjacent stator vanes.

FIG. 4 is an enlarged perspective view of an inner platform and one of the lateral surfaces.

FIG. 5A is an enlarged perspective view of adjacent inner platforms.

FIG. 6 is an enlarged cross-sectional view of a contoured surface adjoining an inner flow path surface and the lateral surface.

DETAILED DESCRIPTION

Figure 1:
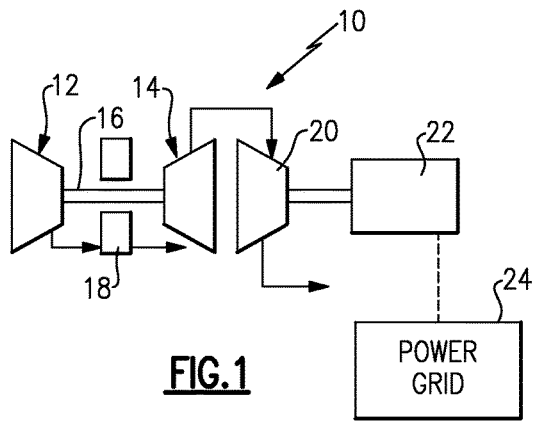
FIG. 1 is a schematic cross-sectional view of an example industrial gas turbine engine.

A schematic view of an industrial gas turbine engine 10 is illustrated in FIG. 1. The engine 10 includes a compressor section 12 and a turbine section 14 interconnected to one another by a shaft 16. A combustor 18 is arranged between the compressor and turbine sections 12, 14. A generator 22 is rotationally driven by a shaft coupled to the turbine or uncoupled via a power turbine, which is connected to a ground-based power grid 24. It should be understood that the illustrated engine 10 is highly schematic, and may vary from the configuration illustrated. Moreover, the disclosed airfoil may be used in commercial and military aircraft engines as well as industrial gas turbine engines.

Figure 2:
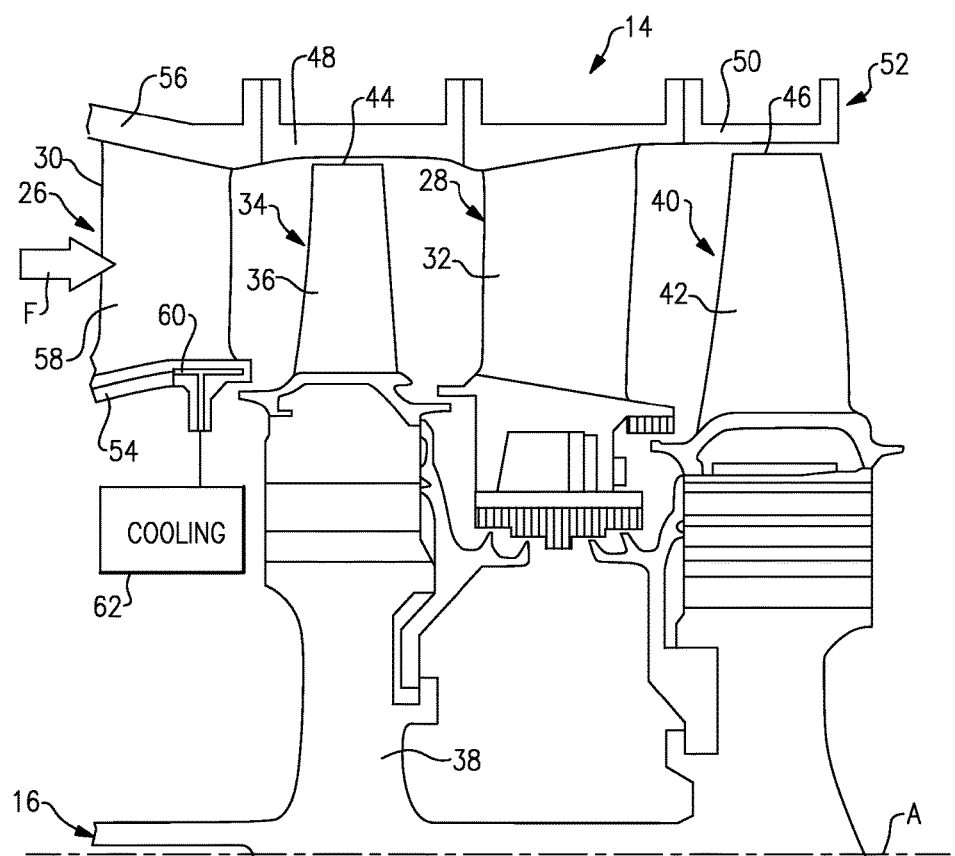
FIG. 2 is a cross-sectional view through a turbine section.
Figure 5B:
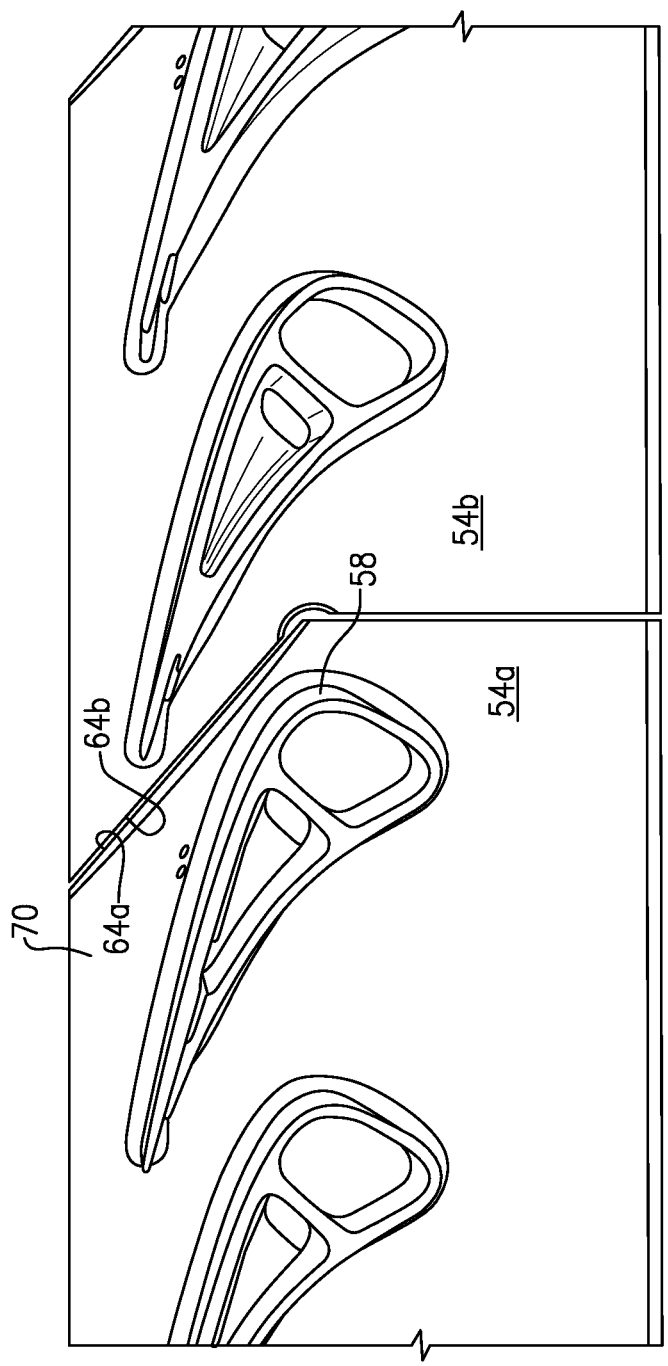
FIG. 5B is an elevational view of the adjacent inner platforms.

Referring to FIG. 2, a cross-sectional view through the turbine section 14 is illustrated. In the example turbine section 14, first and second arrays 26, 28 of circumferentially spaced fixed vanes 30, 32 are axially spaced apart from one another. A first stage array 34 of circumferentially spaced turbine blades 36, mounted to a rotor disk 38, is arranged axially between the first and second fixed vane arrays 30, 32. A second stage array 40 of circumferentially spaced turbine blades 42 is arranged aft of the second array 28 of fixed vanes 32.

The turbine blades 36, 42 each include a tip 44, 46 adjacent to a blade outer air seals 48, 50 of a case structure 52. The first and second stage arrays 26, 28 of turbine vanes and first and second stage arrays 34, 40 of turbine blades are arranged within a flow path F and are operatively connected to the shaft 16, which is rotatable about an axis A.

Each vane, by way of example, vane 30, includes an inner platform 54 and an outer platform 56 respectively defining inner and outer flow paths. The platforms 54, 56 are interconnected by an airfoil 58 extending in a radial direction with respect to the axis A of the shaft 16. It should be understood that the turbine vanes may be discrete from one another or arranged in integrated clusters.

The turbine vanes are constructed from a high strength, heat resistant material such as a nickel-based or cobalt-based superalloy, or of a high temperature, stress resistant ceramic or composite material. In cooled configurations, internal cooling passages 60 receive cooling fluid from a cooling source 62, such as compressor bleed air. The internal cooling passages 60 may provide the cooling fluid to cooling holes to provide for a combination of impingement and film cooling. In addition, one or more thermal barrier coatings, abrasion-resistant coatings or other protective coatings may be applied to the turbine vane.

Referring to FIG. 3, adjacent inner platforms 54a, 54b respectively include slots 66a, 66b that receive a circumferentially extending seal 68. The seal 68 seals a gap 67 between the lateral surfaces 64a, 64b to prevent fluid from escaping the flow path F.

Referring to FIGS. 3-5B, the inner platform 54a includes an inner flow path surface 70 defining the inner portion of the flow path F. The inner flow path surface 70 and the lateral surface 64a are generally at a right angle with respect to one another. A contoured surface 72 adjoins the inner flow path surface 70 and the lateral surface 64a, which extends radially with respect to the axis A, shown in FIG. 2. In the example, the lateral surface 64b adjoins the inner flow path surface 70 to form a right-angled corner.

The contoured surface 72 forms a first edge 84 with the inner flow path surface 70 and a second edge 86 with the lateral surface 64a. The first and second edges 84, 86 are bowed outward relative to one another. The contoured surface 72 may be beveled, or curved as shown in FIG. 4. In one example, the contoured surface 72 has a radius in the range of 0.050 0.300 inch (1.3-7.6 mm). The contoured surface 72 is at an angle 74a with respect to the inner flow path surface 70, and at an angle 74b with respect to the lateral surface 64a. In the example, the angle 74a, 74b are in the range of greater than 0° to 65°, and in the example shown, 45°.

Cooling holes 78 are provided on the contoured surface 72 and with the exit canted aftward toward an aft edge 76 of the inner platform 54a, which is on a suction side of the airfoil 58. The cooling holes 78 are in fluid communication with the cooling passage 60 to deliver cooling fluid to the gap 67. The contoured surface 72 better enables hot gases from the flow path F to escape the gap 67, which results in improved cooling of the inner platforms 54a, 54b.

Referring to FIG. 6, a thermal barrier coating (TBC) 82 is provided on the inner flow path surface 70 and the contoured surface 72. The cooling holes 78 extend through the TBC 82.

Although an example embodiment has been disclosed, a worker of ordinary skill in this art would recognize that certain modifications would come within the scope of the claims. For example, the disclosed platform contour may be used for other airfoil components, such as blades. For that reason, the following claims should be studied to determine their true scope and content.

What is claimed is:

1. An airfoil component for a gas turbine engine comprising:
   a platform joined to an airfoil, the platform includes an inner flow path surface extending between spaced apart lateral surfaces, the airfoil extends from the flow path surface, and a contoured surface adjoins the flow path surface and one of the lateral surfaces;
   a cooling passage; and cooling holes that extend through the contoured surface and are in fluid communication with the cooling passage; and
   a thermal barrier coating provided on the inner flow path surface and the contoured surface, the cooling holes extend through the thermal barrier coating on the contoured surface.

2. The airfoil component according to claim 1, comprising inner and outer platforms joined by the airfoil, one of the inner and outer platforms providing the platform.

3. The airfoil component according to claim 2, wherein the platform is provided by an inner platform.

4. The airfoil component according to claim 1, wherein the contoured surface is at first and second angles with respect to the flow path surface and the lateral surface, respectively, the first and second angles are between 0° and 65°.

5. The airfoil component according to claim 4, wherein the contoured surface is curved.

6. The airfoil component according to claim 4, wherein the first and second angles are 45°.

7. The airfoil component according to claim 1, wherein the exit of the cooling holes are directed aftward toward a trailing edge of the airfoil.

8. The airfoil component according to claim 1, wherein a slot is provided in the platform beneath the flow path surface, the slot configured to receive a seal.

9. A stator vane array for a gas turbine engine, comprising:
a circumferential array of stator vanes;
wherein each stator vane has inner and outer platforms joined by an airfoil, the inner platform includes an inner flow path surface extending between spaced apart lateral surfaces of the circumferentially adjacent stator vanes, the lateral surfaces of the circumferentially adjacent stator vanes adjacent to one another, the airfoil extends from the inner flow path surface;
a contoured surface adjoins the inner flow path surface and one of the lateral surfaces; contoured surface adjoins the flow path surface and one of the lateral surfaces;
a cooling passage; and cooling holes that extend through the contoured surface and are in fluid communication with the cooling passage; and
a thermal barrier coating provided on the inner flow path surface and the contoured surface, the cooling holes extend through the thermal barrier coating on the contoured surface.

10. The stator vane array according to claim 9, wherein the contoured surface is at first and second angles with respect to the inner flow path surface and the lateral surface, respectively, the first and second angles are between 0° and 65°.

11. The stator vane array according to claim 10, wherein the contoured surface is curved.

12. The stator vane array according to claim 10, wherein the first and second angles are 45°.

13. The stator vane array according to claim 9, wherein the cooling holes are directed aftward on a suction side of the airfoil.

14. The stator vane array according to claim 9, comprising a seal circumferentially extending between adjacent vane inner platforms.

15. A gas turbine engine comprising:
compressor and turbine sections;
a combustor provided axially between the compressor and turbine sections;
a turbine vane in the turbine section including:
inner and outer platforms joined by an airfoil, the inner platform includes an inner flow path surface extending between spaced apart lateral surfaces, the airfoil extends from the inner flow path surface, and a contoured surface adjoins the inner flow path surface and one of the lateral surfaces;
a cooling passage; and cooling holes that extend through the contoured surface and are in fluid communication with the cooling passage;
a seal circumferentially extends between the inner platforms of circumferentially adjacent vanes; and
a thermal barrier coating provided on the inner flow path surface and the contoured surface, the cooling holes extend through the thermal barrier coating on the contoured surface.

16. The gas turbine engine according to claim 15, comprising a generator operatively coupled to the turbine section, the generator configured to be electrically connected to a ground-based power grid.

17. The gas turbine engine according to claim 15, wherein the contoured surface is at first and second angles with respect to the inner flow path surface and the lateral surface, respectively, the first and second angles are between 0° and 65°.

18. The gas turbine engine according to claim 17, wherein the contoured surface is curved.

* * * * *